T. HARGIE.
DRILLING MACHINE.
APPLICATION FILED AUG. 24, 1906.

927,528.

Patented July 13, 1909.

Witnesses:

Inventor,
Thomas Hargie
By Chappell & Earl
Att'ys

UNITED STATES PATENT OFFICE.

THOMAS HARGIE, OF KALAMAZOO, MICHIGAN, ASSIGNOR, BY MESNE ASSIGNMENTS, TO EUGENE COOK, OF KALAMAZOO, MICHIGAN.

DRILLING-MACHINE.

No. 927,528.        Specification of Letters Patent.        Patented July 13, 1909.

Application filed August 24, 1906.   Serial No. 331,883.

*To all whom it may concern:*

Be it known that I, THOMAS HARGIE, a citizen of the United States, residing at Kalamazoo, in the county of Kalamazoo, State of Michigan, have invented certain new and useful Improvements in Drilling-Machines, of which the following is a specification.

This invention relates to improvements in drilling machines.

The main object of this invention is to provide in a drilling machine an improved mechanism for quickly feeding the drill up to or withdrawing it from the work.

Further objects, and objects relating to structural detail, will definitely appear from the detailed description to follow.

I accomplish the objects of my invention by the devices and means described in the following specification.

The invention is clearly defined and pointed out in the claims.

Figure 1:
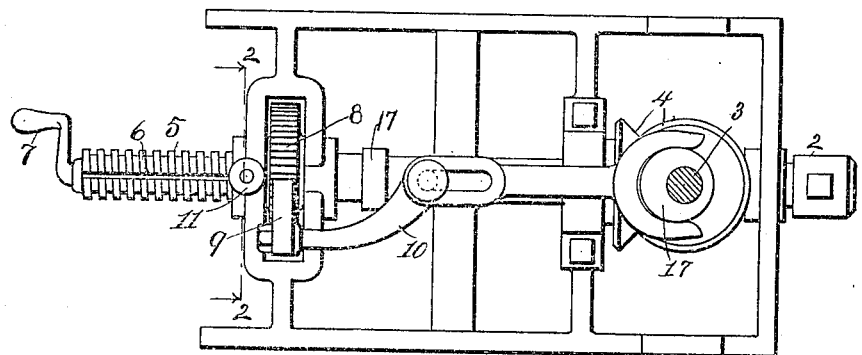
Figure 2:
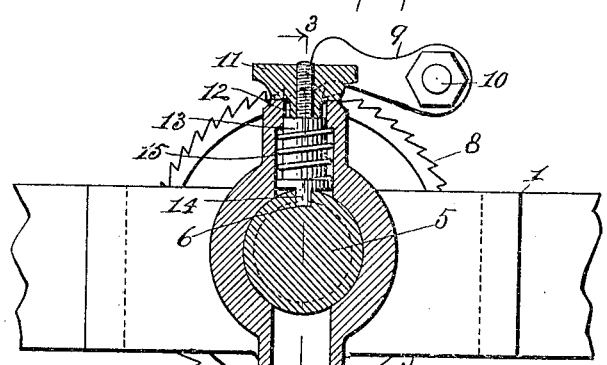
Figure 5:
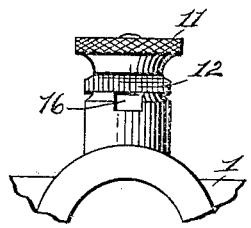
Figure 3:
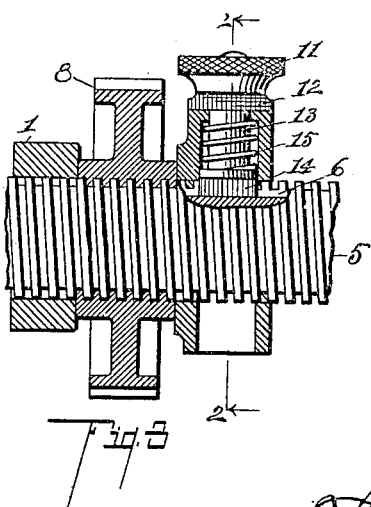
Figure 4:
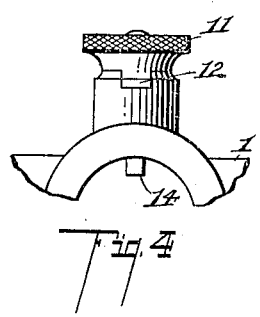

The structure embodying the features of my invention is clearly illustrated in the accompanying drawing forming a part of this specification, in which:

Figure 1 is a plan view of a structure embodying the features of my invention, the upright or standard for the driving shaft being removed and the driving shaft shown in section. Fig. 2 is an enlarged detail taken on a line corresponding to line 2—2 of Figs. 1 and 3 showing details of my improved feed mechanism. Fig. 3 is a detail longitudinal section taken on a line corresponding to line 3—3 of Fig. 2. Fig. 4 is an enlarged detail showing the key for the feed screw in its engaging position. Fig. 5 is a similar view showing the key in its disengaging position.

In the drawing, similar reference numerals refer to similar parts throughout the several views, and the sectional views are taken looking in the direction of the little arrows at the end of the section lines.

Referring to the drawing, the frame 1 may be of any suitable form to properly support the operative mechanism. The tool holder 2 is arranged in suitable bearings on the frame 1. The driving shaft 3 is preferably arranged in a vertical position and is connected to the tool holder by the bevel gears 4. A feed screw 5 is provided for the tool holder. The feed-screw is connected to the tool holder by means of a suitable swivel 17, details of the swivel not being here illustrated. The feed screw is provided with a longitudinal groove adapted to receive the tang 14 of the key 13 by which the screw is locked against rotation. The key 13 is arranged in a suitable socket provided therefor in the frame above the screw as is clearly illustrated in the drawing. The key is held normally in its engaging position by the coil spring 15 arranged thereon, see Figs. 2 and 3. A finger piece 11 is provided for the key so that it may be lifted from engagement with the screw when it is desired that the same shall be revolved. The finger piece 11 is provided with a rib like projection 12 on its under side adapted to engage in the slot 16 when the key is in its engaging position. When the rib is lifted from the slot and the key turned transversely thereto the tang of the key is locked out of engagement with the screw so that the screw may be freely revolved. A crank 7 is provided for this purpose. By this means the tool holder can be quickly fed forward or withdrawn to bring the drill into or out of operative position.

When the drill is in operation the feed screw is advanced by means of the feed wheel 8, which is threaded thereon. The feed wheel 8 is actuated by a lever 10, which is preferably driven by the driving shaft 3 which has a cam 17 thereon arranged to act on the lever. The feed lever 10 is provided with a suitable pawl as 9 for the feed wheel.

In operation when it is desired to rapidly advance or retract the tool holder the key 13 is lifted from engagement with the screw, when by means of the crank 7, the screw may be rapidly advanced or withdrawn, the feed wheel being held against rotation. When the screw is advanced the pawl 9 serves as an effective means for holding the feed wheel, but in withdrawing the same, the feed wheel is held against rotation by the foot or hand of the operator.

I have illustrated and described my improved feed mechanism in detail in the form preferred by me on account of the structural simplicity and convenience in use. I am, however, aware that it is capable of considerable variation in structural detail without departing from my invention.

Having thus described my invention, what I claim as new and desire to secure by Letters Patent, is:

1. In a drilling machine, the combination of a frame; a tool holder; a feed-screw therefor arranged in a bearing provided therefor in said frame, said feed-screw having a longitudinal groove therein; a swivel connection for said tool holder and feed-screw; a feed-wheel threaded upon said feed-screw, secured against longitudinal movement thereon; an adjustable key carried by said frame adapted to engage the groove in said feed-screw for locking said screw against rotation; means for holding said key out of engagement with said groove; and a crank on said feed-screw for manipulating the same when said key is disengaged therefrom.

2. In a drilling machine, the combination of a frame; a tool holder; a feed-screw therefor arranged in a bearing provided therefor in said frame, said feed-screw having a longitudinal groove therein; a swivel connection for said tool holder and feed-screw; a feed-wheel threaded upon said feed-screw, secured against longitudinal movement thereon; an adjustable key carried by said frame adapted to engage the groove in said feed-screw for locking said screw against rotation; and means for holding said key out of engagement with said groove.

In witness whereof, I have hereunto set my hand and seal in the presence of two witnesses.

THOMAS HARGIE. [L. S.]

Witnesses:
  OTIS A. EARL,
  LULU G. GREENFIELD.